Dec. 26, 1967  D. N. TOMA  3,359,760
CONTROL FOR AUTOMATIC WASHER
Filed Nov. 21, 1966  2 Sheets-Sheet 1
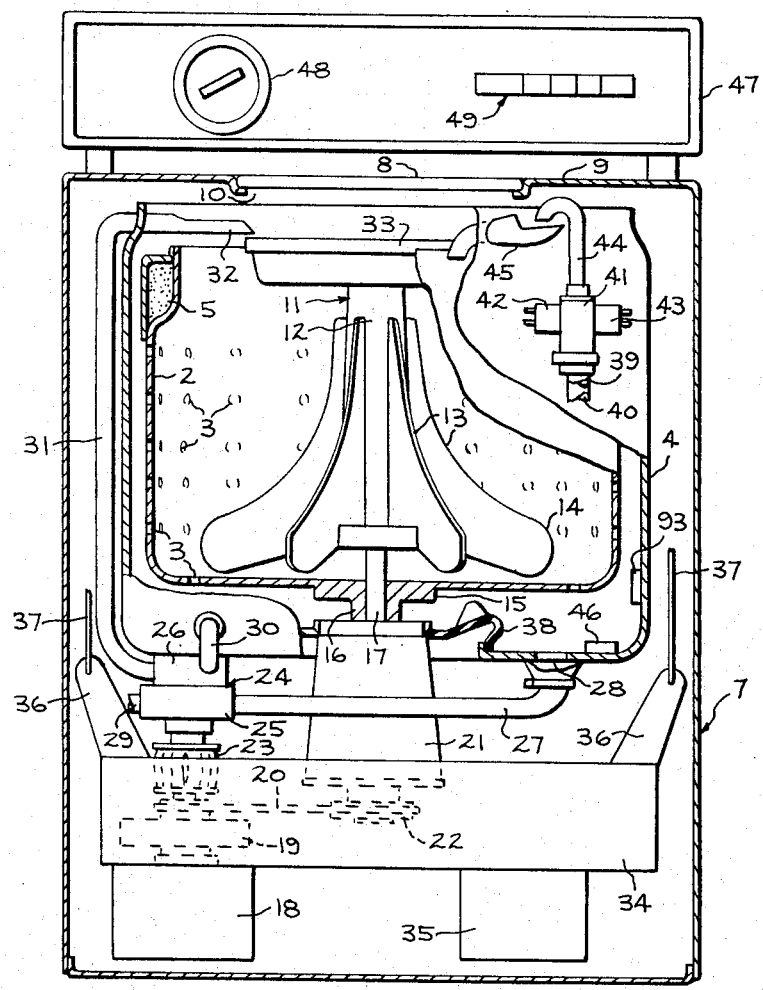
INVENTOR.
DANIEL N. TOMA
BY Radford M. Reams
HIS ATTORNEY

INVENTOR.
DANIEL N. TOMA
HIS ATTORNEY

United States Patent Office 3,359,760
Patented Dec. 26, 1967

3,359,760
CONTROL FOR AUTOMATIC WASHER
Daniel N. Toma, Louisville, Ky., assignor to General
Electric Company, a corporation of New York
Filed Nov. 21, 1966, Ser. No. 595,709
14 Claims. (Cl. 68—12)

The present invention relates to fabric washing machines and more particularly to an improved control for such machines.

Over the years it has become highly desirable to provide automatic washing machines with a number of possible cycles in order most effectively to process different types of loads. One of the most troublesome problems encountered in trying to provide a flexible control for such machines has been the provision of a highly reliable, relatively inexpensive flexible means of selectively adjusting the duration of the various steps of the cycle of machine operation. Some approaches have provided substantial flexibility and reliability with the penalty of relatively high cost. Other approaches involve relatively low cost but provide only limited flexibility.

One object of this invention is to provide an improved washing machine control for selectively varying the duration of individual steps of the fabric cleaning cycle.

Another object of this invention is to provide such an improved control which is very flexible and highly reliable in operation and, at the same time, involves relatively low cost of installation.

There is an increasing interest in providing automatic washing machines which are truly "condition controlled." With such a machine the user only would have to set a control indicating the type of load (regular cotton, wool, permanent press, etc.) and start the machine. The machine would then proceed through a complete cycle of operation in which, for instance, it will fill to the proper level with water of the correct temperature, wash the fabrics for the optimum period of time, extract the right percentage of wash liquid, fill with appropriate rinse liquid, agitate the fabrics for an optimum period and extract liquid until the fabrics have optimum liquid retention. One difficulty in providing such a machine is obtaining a control which is readily adaptable to use with devices which are responsive to various conditions of the liquid and fabrics for controlling various steps in the machine cycle of operation.

A further object of this invention is to provide an improved washing machine control which is readily adaptable for use with various such washing step condition responsive devices.

In accordance with one aspect of the invention there is provided; in a washing machine adapted to perform a fabric cleaning cycle including steps of washing, rinsing and vitiated fluid extraction; a sequence control means including a variable speed timer motor for controlling the operation of the machine. The control includes a circuit adapted to connect the timer motor to a source of electrical energy. The circuit includes a bi-directional current conducting semiconductor normally exhibiting a high impedance between two termnals thereof, connected in series with the timer motor, and exhibiting a low impedance therebetween in response to the application of a signal having an amplitude greater than a predetermined magnitude to a third terminal thereof. The circuit further includes a triggering means operable during at least one of the steps of machine operation to apply signals to the third terminal that are characterized by an amplitude of at least the predetermined magnitude to control that step independent of other steps.

The invention both as to its organization and principles of operation together with further objects, features and advantages thereof may best be understood by reference to the following specification, read in conjunction with the appended drawings in which:

FIGURE 1 is a front elevational view, partially sectioned, of a clothes washing machine utilizing my invention;

FIGURE 2 is a schematic diagram illustrating a basic form of one embodiment of the timer motor energization circuit used in my invention;

Figure 3:
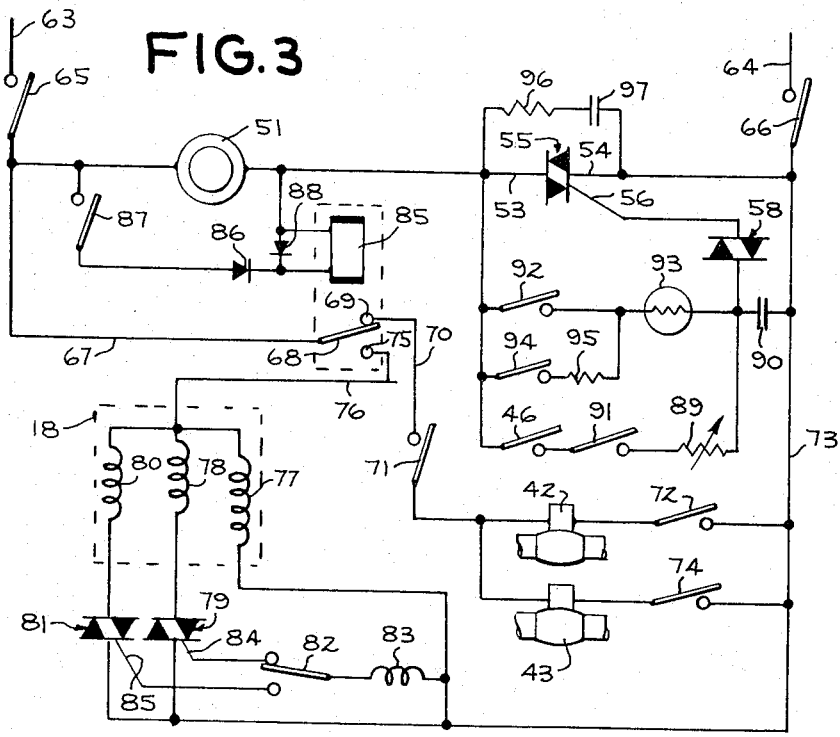
FIGURE 3 is a schematic diagram of one form of a full control circuit for an automatic washer incorporating my invention, which circuit is incorporated in the machine of FIGURE 1.

Referring now to FIGURE 1 of the drawing, I have shown therein automatic clothes washing machine 1 having a conventional basket or clothes receiving receptacle 2 provided over its side and bottom walls with perforations 3 and disposed within an imperforate tub or casing 4. The basket and tub together form a receptacle to receive fluid and fabrics to be washed in the fluid. The basket is provided with a balance ring 5 to alleviate the effect of unbalanced fabric loads when the basket is rotated and thus steady the basket during high speed extraction operations.

Tub 4 is rigidly mounted within an appearance cabinet 7 which includes a cover 8 hingedly mounted in the top portion 9 of the cabinet to provide access through opening 10 to the basket. The rigid mounting of tub 4 within cabinet 7 may be effected by any suitable means, for instance, strap members could be provided, each of which is secured at one end to the cabinet and at the other end to the outside of the tub. At the center of the basket 2 there is provided an agitator 11 which includes a centerpost 12 having a plurality of water circulating vanes 13, each of which includes a free-standing, flexible portion 14.

Both the clothes basket 2 and agitator 11 are rotatably mounted. The basket is mounted on a flange 15 of a hub 16 and the agitator 11 is mounted on a shaft 17 which extends upwardly through the hub 16 and through the centerpost 12 and is secured to the agitator so as to drive it. During a cycle of operation of the machine 1, fluid is introduced into the tub 4 and basket 2 and the agitator 11 is then oscillated back and forth on its axis, that is, in a horizontal plane within the basket, to wash the clothes therein. After a predetermined period of this washing action, basket 2 is rotated at high speed to extract centrifugally the vitiated wash fluid from the fabrics and discharge it to drain. Following this extraction operation, a supply of clean liquid is introduced into the basket for rinsing the fabrics and the agitator is again oscillated. Finally, the basket is once more rotated at high speed to extract the vitiated rinse fluid.

The basket 2 and agitator 11 may be driven by any suitable means. By way of example, I have shown them as driven from reversible motor 18 through a drive mechanism including a clutch 19 mounted on the motor shaft. The motor is tailored so as to be used to its full extent when it accelerates the basket up to spin speed. In order to assist the motor during starting, clutch 19 allows the motor to start without a load and then accept the load as it comes up to speed. A suitable belt 20 transmits power from clutch 19 to a transmission assembly 21 through a pulley 22. Thus, depending upon the direction of motor rotation, the pulley 22 of transmission 21 is driven in opposite direction. Transmission 21 is so arranged that it supports and drives both the agitator drive shaft 17 and the basket mounting hub 16. When motor 18 is rotated in one direction, the transmission causes agitator 11 to oscillate, and, when motor 18 is driven in the opposite direction, transmission rotates the clothes basket 2 and agitator 11 together at high speed for centrifugal fluid extraction. While the specific type of transmission used does not form part of the invention, reference is made to Patent 2,844,225 issued to James R. Hubbard et al. on July 22, 1958, and assigned to the General Electric Company, assignee of the present invention. That patient discloses in detail the structural characteristics of a transmission assembly suitable for use in the illustrated machine.

In addition to operating the transmission 21 as described, motor 18 also provides a direct drive through a flexible coupling 23 to a pump structure, generally indicated at 24, which may include two separate pumping units 25 and 26 both of which are operated simultaneously in the same direction by motor 18. Pump unit 25 has an inlet connected by a conduit 27 to an opening 28 formed in the lowermost part of tub 4. Pump unit 25 also has an outlet connected by a conduit 29 to a suitable drain (not shown). Pump unit 26 has an inlet connected by a conduit 30 to the interior of tub 4 and an outlet connected by a conduit 31 to a nozzle 32 which is positioned to discharge into a suitable filter pan 33 which may be secured to the top portion of agitator 11 so as to be movable therewith. With this structure, then, when the motor is operating so as to provide agitation, pump unit 26 draws liquid in through conduit 30 from tub 4 and discharges it through conduit 31 so that the liquid passes from nozzle 32 into filter pan 33, and then down through a number of small openings provided in the bottom of the filter pan back into the basket. Conversely, when the motor is operated so as to rotate basket 2 and agitator 11 together at high speed to centrifugally extract the fluid from fabrics in the basket, pump unit 25 will draw liquid in from opening 28 through conduit 27 and discharge it through conduit 29 to drain. Each of the pump units is substantially inoperative in the direction of rotation in which it is not used.

Motor 18, clutch 19, transmission 21, basket 2 and agitator 11 form a suspended washing and centrifuging system which is supported by the stationary structure of the machine (including tub 4) so as to permit isolation of vibrations from the stationary structure. While any suitable suspension structure may be used, by way of Example I show a suspension structure which includes a bracket member 34 with transmission 21 mounted on the top thereof and motor 18 mounted to the underside thereof. A counterweight 35 is mounted on the bracket 34 opposite motor 18 to balance the weight distribution of the various components of the suspended system. The bracket member, in turn, is secured to upwardly extending rigid member 36 and each of the two upwardly extending members 36 is connected to a cable 37 supported from the top of the machine. While only a portion of the suspension system is shown in the drawing, such a vibration isolation system is fully described and claimed in Patent 2,987,190 issued to John Bochan on June 6, 1961, and assigned to General Electric Company, the assignee of the present invention.

In order to accommodate the movement which occurs between basket 2 and tub 4 without any danger of fluid leakage between, the stationary tub 4 is joined to the upper part of transmission 21 by a flexible boot member 38. A member of this type is described and claimed in Patent 2,959,966 issued to John Bochan on Nov. 15, 1960, and assigned to the General Electric Company, assignee of the present invention.

Hot and cold water may be supplied to the machine through conduits 39 and 40 which are adapted to be connected respectively to sources of hot and cold water (not shown). Conduits 39 and 40 extend into a conventional mixing valve structure 41 having solenoids 42 and 43 being connected to a hose 44. In a conventional manner selective energization of solenoids 42, 43 or both 42 and 43 will provide for the passage of hot, cold or warm water from the mixing valve 41 through the hose 44. Hose 44 is positioned to communicate with a nozzle 45 positioned to discharge into the basket 2 and tub 4 so that when one or both of the solenoids 42 and 43 are energized water enters basket 2 and tub 4. The level to which the water rises in the basket and tub may be controlled by any suitable water level control means, for instance, a pressure sensitive switch 46 may be positioned in the lower portion of tub 4 so that, when water has risen within the tub 4 and basket 2 to a predetermined level, sufficient pressure will be exerted upon the switch 46 to cause de-energization of whichever of solenoids 42 and 43 have been energized.

The backsplasher 47 may have suitable manual controls, such as rotatable control member 48 and pushbuttons 49 extending therefrom so that the particular fabric cycle, including, for instance, washing and spin speeds, water temperature, water level within the tube 4 and basket 2, etc., may be controlled to effect the washing of different types of fabrics.

In accordance with my invention I provide a new and improved washing machine control for selectively varying the duration of the individual steps of the fabric cleaning cycle. According to one embodiment of my invention I provide a single, variable speed timer motor such as, for instance, a shaded pole motor which functions to drive the timing control mechanism for the various steps of the fabric cleaning cycle. I connect the timer motor to a source of electrical energy through a control circuit including a bi-directional, current conducting semiconductor, which functions to control the speed of the timer motor.

Referring now to FIGURE 2 of the drawings, there is shown a schematic circuit diagram showing a basic circuit suitable for speed control of a variable speed timer in an automatic washing machine. In the circuit shown in FIGURE 2, the main winding 50 of shaded pole timer motor 51 is connected to a suitable source of alternating electrical energy 52 in series with the end terminals 53 and 54 of a bi-directional, current conducting semiconductor 55, commonly known as a Triac, which also includes a third or gate terminal 56. Triacs, which are well known in the electronics art, normally exhibit a high impedance between their end terminals and exhibit a low impedance therebetween in response to the application of a signal, having an amplitude greater than a pre-determinted magnitude, to their third or gate terminal. Possible modes of operation of Triacs include conduction from terminal 53 to terminal 54 in response to a predetermined positive signal applied to terminal 56, conduction from terminal 53 to terminal 54 in response to a suitable negative signal applied to terminal 56, conduction from terminal 54 to terminal 53 in response to a suitable positive signal applied to terminal 56, and conduction from terminal 54 to terminal 53 in response to a suitable negative signal applied to terminal 56. By proper construction of Triac 55 any two of these four modes of operation are possible. For purposes of explanation of the control circuit it will be assumed that a Triac 55 has been chosen to exhibit a low impedance to current flow from terminals 54 to terminal 53 in response to a suitable positive signal applied to gate terminal 56 and a low impedance to current flow from terminal 53 to terminal 54 in response to a suitable negative signal applied to gate terminal 56. One such Triac is sold by General Electric Company under the Part No. GEJ257B. With suitable positive and negative signals applied to gate terminal 56 in appropriate phase relationship to the signal applied across terminals 53 and 54 the Triac will offer a very low resistance to almost the entire full wave of alternating current. Obviously, by appropriately delaying the points during the positive and negative half cycles of the alternating current supply when the suitable signal is applied to gate terminal 56 the Triac may be caused to exhibit a low resistance to proportionately smaller portions of each half wave applied across the terminals 53 and 54. The circuit of FIGURE 2 includes a phase control triggering circuit comprising a variable resistance 57a, a capacitor 57b and a two-terminal, bi-lateral device (commonly known as a Diac) connected selectively to supply a triggering signal to Triac 55 at controlled instants of time within each half cycle of the alternating current from source 52. The variable resistance 57a is serially connected with capacitor 57b across the two end terminals 53 and 54 of the Triac 55 and the Diac 58 interconnects the junction of elements 57a and 57b to the gate terminal of Triac 55.

In operation, as the voltage applied by source 52 increases in a first direction across variable resistor 57a and capacitor 57b the capacitor 57b begins to accumulate a charge at a rate determined by the time constant established jointly with variable resistor 57a. When the voltage across capacitor 57b attains the threshold or breakover voltage of Diac 58, the Diac switches to a low impedance state furnishing a low impedance path to the gate electrode 56 of Triac 55. Capacitor 57b discharges in this path, supplying a signal of the appropriate polarity to the gate terminal 56, so that Triac 55 assumes a low impedance state. Power then is supplied by Triac 55 to the main winding 50 of the timer motor 51 for the remainder of that half cycle. At the commencement of the succeeding half cycle, when the supply current goes to zero, Triac 55 resumes its high impedance state and remains non-conductive until capacitor 57b is charged in the opposite direction to the threshold voltage of Diac 58. In a complete cycle of operation of this circuit, therefore, capacitor 57b charges in both polarities. At some time during each of the charging intervals, the threshold voltage of Diac 58 is attained and the capacitor discharges into the gate terminal of Triac 55 which thereupon switches to a conductive state and provides power to the winding 50. Control over the instant of time at which current conduction to winding 50 occurs is determined by the value of variable resistor 57a and, of course, this resistor may be set either manually or in accordance with some pre-desired control function. A Diac suitable for use in such a circuit is sold by General Electric Company as Part No. GE2J238. This and similar power control circuits are illustrated and described in Application Note 200.35, entitled, "Triac Control for AC Power," by E. K. Howell, published by Semiconductor Products Department, General Electric Company, in February 1964.

The shaded pole motor is designed so that the rotational speed of its rotor 59 varies in response to the portion of each full wave of electrical energy which is applied to the motor winding 50 by Triac 55. In order to control the various steps in the cycle of operation of a washing machine the rotor 59 is operatively connected to a suitable sequence control means such as the printed circuit board schematically illustrated at 60 so that the board is rotated at a speed proportional to the speed of the timer motor. As is well known in the control art, various conductive tracks 61 are provided on the circuit board 60 to cooperate with followers 62 which, in turn, are connected in the control circuit of the washing machine. The cam tracks 61 are made selectively discontinuous so as to make and break electrical contact between selected ones of the followers 62 to control appropriate subcircuits in the washing machine control circuit in order to provide a desired sequence of operation of the washing machine. The followers and tracks may be considered as printed circuit switches and schematically represented as conventional switches.

Turning now to FIGURE 3 there is shown therein a suitable sequence control for an automatic washing machine utilizing a variable speed timer motor and bi-directional current conducting semiconductor and triggering means for the semiconductor to control selected steps of the washing machine cycle of operation independent of the other steps. The full washer control circuit shown in FIGURE 3 incorporates the basic type of circuit illustrated in FIGURE 2.

The control circuit as a whole is adapted to be energized from a source of alternating electrical energy, such as the usual 110 v. household supply, through a pair of conductors 63 and 64. The timer motor 51 is connected between conductor 63 and conductor 64 through a printed circuit type main switch 65, end terminals 53 and 54 of Triac 55 and a manual switch 66. The rotatable control member 48 (shown in FIGURE 1) is connected to the manual switch 66 and to the rotor 59 of the timer motor 51. Member 48 may be arranged so that, when rotated, it will rotate the printed circuit board to effect opening or closing of the switches constituted by the tracks 61 and the followers 62 while pushing it in will open switch 66 and pulling it out will close the switch. When the machine completes the usual cycle of operation the timer motor opens main switch 65 so as to de-energize the entire system. When it is desired to begin a subsequent cycle of operation, member 48 is pushed inwardly opening switch 66, then rotated a distance sufficient to close main switch 65 and then pulled outwardly closing switch 66. Thus, the entire circuit is connected to a suitable source of electric energy between conductor 63 and conductor 64 by both switches 65 and 66 being closed.

From switch 65 one branch of the control circuit extends through a conductor 67, a relay operated switch 68, associated contact 69 and conductor 70 to a printed circuit switch 71. From printed circuit switch 71 a pair of parallel branch sub-circuits exist. The first extends through hot water solenoid 42, a manual switch 72 and a conductor 73 to switch 66. The other branch circuit extends through cold water solenoid 43 and a manual switch 74 to conductor 73 and then switch 66. Thus, with switch 68 in engagement with contact 69 and printed circuit switch 71 closed hot water may be selected by manually closing switch 72, cold water by closing switch 74 and warm water by closing both switches 72 and 74. These switches may be opened and closed by any suitable means, for instance, by selected ones of the pushbuttons 49. It will be understood that, while I have shown a completely manual means for selecting the water temperature, a large number of automatic means interconnecting the switches 72 and 74 are well known in the art for automatically correlating different wash and rinse water temperatures. Such water selection control arrangements obviously may be utilized without departing from the scope of my invention.

An additional branch circuit is provided from switch 68 through a contact 75 and conductor 76 to main washing machine motor 18. The main or run winding 77 of motor 18 is connected between the conductor 76 and conductor 73. A start winding 78 for a first direction of motor rotation is connected between conductor 76 and one end terminal of a Triac 79, the other end terminal of which is connected to conductor 73. Similarly, a start winding 80 for the other direction of motor rotation is connected between conductor 76 and one end terminal of a Triac 81, the other end terminal of which is connected to conductor 73. A printed circuit switch 82 is provided and is connected through a coil 83 to conductor 73. In one position (that shown in FIGURE 3) switch 82 connects gate terminal 84 of Triac 79 through coil 83 to conductor 73 while, in its other position, switch 82 connects gate terminal 85 of Triac 81 to conductor 73 through coil 83.

The selectivity between providing power to the water supply circuit or to the motor circuit is provided by a relay 85 which is operatively connected to relay switch 68 so that, when the relay is unenergized or off, the switch 68 will be in engagement with contact 69 and, when relay 85 is energized, switch 68 will be moved into engagement with contact 75. The relay 85 is connected in parallel with the timer motor 51 through a diode 86 and a printed circuit switch 87. The diode 86 functions so as to provide half wave power to the relay 85, when printed circuit switch 87 is closed and Triac 55 is exhibiting a low impedance between terminals 53 and 54 during at least a portion of each half wave of applied electrical energy. The relay 85 is designed to function effectively even though only a very small portion of each half cycle of applied energy is passed by Triac 55. In order to insure that the relay 85 functions properly during the current half cycles which are blocked by diode 86 a similar diode 88 is connected across the relay 85 with the opposite polarity to diode 86. With this connection then, when diode 86 prevents current flow through relay 85 the collapsing field of the relay will cause a circulating current to flow through diode 87 and relay 85. This effectively causes the relay to keep switch 86 in engagement with contact 75 until the succeeding half cycle of current, which will be passed by diode 86.

A phase controlled triggering circuit for the wash agitation step, which includes variable resistor 89, a capacitor 90 and Diac 58, is connected to selectively supply a triggering signal to Triac 55 at controlled instants of time within each half cycle of the supplied alternating current energy during the wash step. The resistance 89, which, for instance, may be varied between approximately 10,000 ohms and approximately 200,000 ohms, is connected in series with the capacitor 90 (which may be $\frac{1}{10}$ microfarad) and further in series with the pressure switch 46 and a printed circuit switch 91 across the two end terminals 53 and 54 of the Triac 55. The Diac 58 interconnects the junction of variable resistor 89 and capacitor 90 with the gate terminal 56 of Triac 55. In order to control the wash spin step and the rinse spin step of the machine the serial connection of pressure switch 46, printed circuit switch 91 and resistor 89 is connected in parallel with two additional circuits. The first of these is a serial connection of a printed circuit switch 92 and a thermistor 93. The second is the serial connection of a printed circuit switch 94 and a resistor 95 which are connected in parallel with printed circuit switch 92 and in series with thermistor 93. The thermistor, for example, may be of the self-heating type which exhibits a 10,000 ohm resistance when not in contact with water and a 200,000 ohm resistance when in contact with water and is mounted in tub 4 so as to be exposed to the inside of the tub at some suitable height such as below the bottom of basket 2 (as shown in FIGURE 1). The resistor 95 may have some suitable value such as, for instance, 40,000 ohms.

When a Triac such as that illustrated at 55 is utilized in a highly inductive circuit such as the washer control of FIGURE 3 the phase difference between the applied voltage and the current flow through the Triac may cause the Triac to continue to conduct through the zero voltage point of the applied signal and then turn off at some later point in the cycle. This would obviously cause unacceptable erratic operation of the control circuit. In order to prevent the possibility of such erratic operation a resistance 96 and capacitor 97 are serially connected together and across the end terminals 53 and 54 of the Triac 55. These elements, for instance, may be 100 ohms and $\frac{1}{10}$ microfarad respectively.

Figure 4:
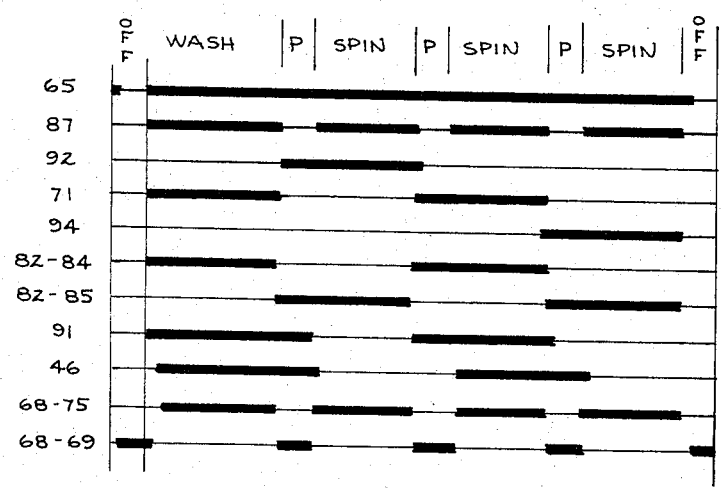
FIGURE 4 is a schematic presentation of the sequence of operation of the various switches depicted in FIGURE 3, thereby indicating a typical sequence of operation of the machine of FIGURE 1.

Referring now to FIGURE 4 in conjunction with FIGURES 1 and 3, there will be described a typical cycle of operation for the machine illustrated in FIGURES 1 and 3. It will be understood that the various sections of FIGURE 4 depict which switches are open and which switches are closed during various steps in the cycle of operation, with the heavy lines indicating a switch closed configuration and a light line indicating a switch open configuration. As stated previously, printed circuit switch 65 opens to end a cycle of operation and so, to begin the next cycle, manual member 48 is pushed inwardly, opening switch 66, and rotated so as to rotate the printed circuit board. This rotation causes switch 65 to be closed, switch 87 to be closed, switch 71 to be closed, switch 82 to connect terminal 84 to conductor 73 and switch 91 to be closed. At this time switch 68 is in engagement with contact 69 because no current is flowing to the timer motor 51 and relay 85. The manually operable member 48 is then pulled out so as to close switch 66.

With this configuration a circuit is formed from conductor 63 to switch 65, switch 68 and contact 69, switch 71 to the hot and cold water solenoids 42 and 43 and, depending upon which of the manual switches 72 and 74 have been closed by manipulation of appropriate pushbuttons 49, the circuit is completed through conductor 73, switch 66, and conductor 64 so that the appropriate water solenoid(s) will be energized to provide water in the machine. This water fill operation continues as a non-timed function since printed circuit switches 92 and 94 are open and pressure sensitive switch 46 remains open until a predetermined level of water is reached in the tub and basket.

When this predetermined level of water is reached switch 46 closes so that the variable resistance 89, capacitor 90 and Diac 58 function as the timing circuit for Triac 55. Triac 55 then very quickly begins to conduct during the elected portion of each half cycle of applied electric energy determined by the setting of variable resistance 89. The variable resistance 89 may be connected to the rotatable control member 48 or to one of the pushbuttons 49 and its setting determined by manipulation of one of these elements. This setting determines whether variable speed timer motor 51 is operated at a relatively fast speed or a relatively slow speed, since its speed is responsive to the percentage of each half cycle of current provided to it.

Relay 85 is designed to be effective even when Triac 55 passes only a very small portion of each half cycle so that, almost as soon as pressure switch 46 closes, relay 85 is energized and moves switch 68 into engagement with contact 75. This effectively disconnects the water inlet solenoids so that the supply of water to the machine is discontinued and energizes the motor. Since the switch 82 is arranged to be closed the gate terminal 84 of the Triac 79 is connected through the coil 83 to a circuit from contact 75 through main winding 77 to conductor 73. At zero speed the voltage drop across the main winding 77 is relatively low and consequently the voltage applied at the coil 83 is sufficient to cause the Triac 79 to conduct and energize the first start winding 78. This coupled with the low voltage across the main winding is sufficient so that the motor begins to rotate in a first direction, which is effective to cause oscillation of the agitator within the basket to effect cleaning of the clothes in the machine. As the motor comes up to speed, the voltage drop across main winding 77 increases to such a level that there is insufficient voltage applied to the gate of Triac 79 for it to conduct and start winding 78 is thereby effectively de-energized.

Operation continues in this manner with motor 18 causing oscillation of agitator 11 to wash the fabrics and rotation of pump 24 for pump unit 26 to cause recirculation of the washing liquid until the timer motor 51 has rotated sufficiently to cause the printed circuit switch then closed to open so as to result in a pause (P). The length of time required for this to occur is determined by the setting of the variable resistance 89 which determines how fast the timer motor rotates. When the first pause is reached the printed circuit switch 87 is opened thus causing de-energization of relay 85 and movement of switch 68 out of engagement with contact 75 and into engagement with contact 69. Switch 92 is closed, placing thermistor 93 in parallel with variable resistor 89 to reduce the effective resistance and cause the timer motor to quickly advance through the pause. The timer motor causes switch 71 to open and switch 82 to connect terminal 85 to conductor 73. Switch 91 then is opened to place the speed of the timer motor under the control of thermistor 93. Switch 87 then is reclosed causing the re-energization of relay 85 and thus the movement of switch 68 into engagement with contact 75. This causes main winding 77 and start winding 80 of motor 18 to be energized so that the motor begins to rotate in the second or opposite direction and as the motor comes up to speed, start winding 80 is effectively de-energized in the same manner as start winding 78 was during the wash step. This second direction of rotation of motor 18 is effective to cause the basket 2 and agitator 11 to be rotated together at high speed to centrifugally extract liquid from the clothes in the machine and causes pump 24 to be rotated in a direction effective for pump unit 25 to drain the vitiated wash fluid from the tub 4. Almost as soon as the level of water in the tub 4 is brought below the position of thermistor 93 the resistance of the thermistor drops to its low level, resulting in a change in the timing circuit and causing the Triac 55 to conduct a rather large portion of each half cycle of applied energy. Thus, the timer motor is caused to rotate rapidly to quickly end the wash spin step and bring the machine to the next pause. To effect this pause, first switch 71 is closed and then switch 87 is opened, switch 91 is closed and switch 82 is moved from terminal 85 to terminal 84. The opening of switch 87 insures that the relay 85 is de-energized and switch 68 moves to engagement with contact 69.

Finally switch 92 is opened to de-energize the triggering circuit. Thus, the machine is set for a second, non-timed, fill operation similar to the wash fill with the temperature being determined by whichever of the manual switches 72 and 74 have been closed. Again, when the predetermined level of water is reached in the tub, pressure switch 46 closes so that the triggering circuit for Triac 55 is completed. Timer motor 51 begins to run and relay 85 is energized, moving switch 68 into engagement with contact 75. This again energizes main winding 77 and start winding 78 of motor 18 to cause a second period of oscillation of the agitator to effectively rinse the fabrics. This oscillation of the agitator continues for a period of time determined by the setting of variable resistance 89 after which the third pause is reached. If desired a separate variable resistor could be provided and connected in the control circuit of Triac 55 by an appropriate printed circuit switch element for the rinse cycle so its time could be controlled independently of the time of the wash cycle.

During this pause the same switching changes occur as occurred during the first pause with the exception that printed circuit switch 94 is closed rather than printed circuit switch 92. The switch changes during this pause subsequently cause motor 18 to rotate in the second or spin direction so that the basket and agitator are rotated at high speed to centrifugally extract fluid from the clothes and the vitiated rinse fluid is removed from the machine. It will be noted that the resistance for the trigger circuit during rinse spin includes the thermistor 93 and a resistance 95 serially connected therewith so that, when the level of fluid in the tub drops below the thermistor 93 and it switches to its low resistance state there is still a reasonably high resistance in the triggering circuit. This causes the Triac 55 to conduct during a smaller portion of each half cycle of applied energy than was the case during the wash spin step. Thus, the rinse spin step continues for an appreciable period after the level of water in the tub is reduced below the bottom of the basket, enabling the basket to reach a very high spin speed so that the clothes will be effectively damp-dried. At the end of the spin operation printed circuit switch 87 is opened and then almost immediately thereafter main printed circuit switch 65 is opened thus de-energizing the entire machine.

For illustrative purposes I have shown a circuit including single value wash and rinse spin triggering circuits. However, it will be understood that resistance 95 may be made variable and a variable resistance may be placed in series with switch 92 and thermistor 93 so that the length of each spin step will be selectively variable.

I have described a relatively simplified and basic control for ease of understanding. Present day washers often include various improvements such as control panel lights, bleach and detergent dispenser controls, etc., which do not relate to the present invention and have been omitted for the sake of simplicity and ease of understanding. It will be understood that my control is quickly and easily adapted for use in various modified forms and is readily adaptable to use in a condition responsive washing machine. For instance, Patent 3,114,253 issued to Everett D. Morey et al. on Dec. 17, 1963, and assigned to the General Electric Company, assignee of the present invention, describes a washing machine control including a turbidity detector which is effective to determine when the washing action has ceased to be effective. Such a control may easily be included in a machine built in accordance with my invention so as to control the length of the washing step in response to the continued effectiveness of the washing action.

While, in accordance with the patent statutes I have described what at present is considered to be the preferred embodiments of my invention, it will be obvious to those skilled in the art that various changes and modifications may be made therein without departing from my invention, and it is therefore aimed in the appended claims to cover all such changes and modifications as fall within the true spirit and scope of my invention.

What I claim as new and desire to secure by Letters Patent of the United States is:

1. In a washing machine adapted to perform a fabric cleaning cycle including the steps of washing, rinsing and vitiated fluid extracting:
    (a) sequence control means including a variable speed timer motor for controlling the operation of the machine;
    (b) a circuit for connecting said timer motor to a source of electrical energy comprising in combination, a bidirectional current conducting semiconductor normally exhibiting a high impedance between two terminals thereof connected in series with said timer motor and exhibiting a low impedance therebetween in response to the application of a signal having an amplitude greater than a predetermined magnitude to a third terminal thereof, and triggering means selectively operable to apply signals to said third terminal that are characterized by an amplitude of at least said predetermined magnitudes.

2. The invention as set forth in claim 1 wherein said control means includes a shaded pole type timer motor connected in series with said two terminals of said semiconductor.

3. The invention as set forth in claim 1 wherein said triggering means is constituted by a plurality of impedance elements connected in parallel paths to said third terminal, each parallel path including a switch element controlled by said timer motor to complete the circuit in its respective path whereby the application of signals to said third terminal is varied as the value of the impedance element in that path.

4. The invention as set forth in claim 3 wherein the impedance element in one of said paths is manually adjustable.

5. The invention as set forth in claim 3 wherein the impedance element in one of said paths is responsive to a condition in the washing machine.

6. The invention as set forth in claim 3 wherein the impedance element in one of said paths is manually adjustable and wherein the impedance element in another of said paths is responsive to a condition in the washing machine.

7. In a washing machine adapted to perform a fabric cleaning cycle including the steps of washing, rinsing and vitiated fluid extracting:
    (a) sequence control means including a variable speed timer motor for controlling the operation of the machine;
    (b) a circuit for connecting said timer motor to a source of electrical energy comprising in combination, a bidirectional current conducting semiconductor normally exhibiting a high impedance between two terminals thereof connected in series with said timer motor and exhibiting a low impedance therebetween in response to the application of a signal having an amplitude greater than a predetermined magnitude to a third terminal thereof, and triggering means operable during at least a selected one of the steps of operation to apply signals to said third terminal that are characterized by an amplitude of at least said predetermined magnitude to control said step independent of other steps.

8. In a washing machine including a receptacle means to receive liquid and fabrics to be washed in the liquid, agitation means adapted to effect washing of the fabrics and drain means adapted to drain vitiated liquid from the machine:
(a) sequence control means for controlling operation of the agitator means and drain means to provide a sequence of operation including a wash step, a drain step, a rinse step and a drain step;
(b) said sequence control means including a variable speed timer motor effective to control the duration of said steps;
(c) a circuit for connecting said timer motor to a source of electrical energy comprising in combination, a bi-directional current conducting semiconductor normally exhibiting a high impedance between two terminals thereof connected in series with said timer motor and exhibiting a low impedance therebetween in response to the application of a signal having an amplitude greater than a predetermined magnitude to a third terminal thereof, and triggering means operable during at least a selected one of the steps of operation to apply signals to said third terminal that are characterized by an amplitude of at least said predetermined magnitude to control said step independent of other steps.

9. In a washing maching including rotatable container means for liquid and fabrics to be washed in the liquid; flexing means for flexing clothes in the container; liquid introduction means for introducing liquid into the container means; drain means for removing liquid from the container means; and drive means for rotating the container means, operating the flexing means and operating the drain means;
(a) sequence control means for causing in sequence operation of said liquid introducing means, operation of said flexing means, and concurrent rotation of said container means and operation of said drain means to provide in sequence a wash step, a vitiated liquid removal step, a rinse step and a vitiated liquid removal step;
(b) said sequence control means including a variable speed timer motor for controlling the duration of said steps;
(c) a circuit for connecting said timer motor to a source of electrical energy comprising in combination, a bidirectional current conducting semiconductor normally exhibiting a high impedance between two terminals thereof connected in series with said timer motor and exhibiting a low impedance therebetween in response to the application of a signal having an amplitude greater than a predetermined magnitude to a third terminal thereof, and triggering means operable during at least a selected one of the steps of operation to apply signals to said third terminal that are characterized by an amplitude of at least said predetermined magnitude to control said step independent of other steps.

10. The invention as set forth in claim 9 wherein said triggering means includes means responsive to a predetermined high level of liquid in the container and effective during wash and rinse steps to permit application of signals to said third terminal that are characterized by an amplitude of at least said predetermined value until liquid in the container reaches said predetermined high level.

11. The invention as set forth in claim 9 wherein said triggering means includs means responsive to a predetermined low level of liquid in the container and effective during vitiated liquid removal steps to substantially prevent application of signals to said third terminal that are characterized by an amplitude of at least said predetermined value until liquid in the container is reduced to said predetermined low level.

12. In a washing machine including rotatable container means for liquid and fabrics to be washed in the liquid; flexing means for flexing clothes in the container; liquid introduction means for introducing liquid into the container means; drain means for removing liquid from the container means; and drive means for rotating the container means, operating the flexing means and operating the drain means:
(a) sequence control means for causing in sequence operation of said liquid introducing means, operation of said flexing means, and concurrent rotation of said container means and operation of said drain means to provide in sequence a wash step, a vitiated liquid removal step, a rinse step and a vitiated liquid removal step;
(b) said sequence control means including a timer motor for controlling the duration of said steps, said motor operating at a predetermined speed when provided with full wave alternating electrical energy and operating at slower speeds in response to partial wave electrical energy;
(c) a circuit for connecting said timer motor to a source of full wave alternating electrical energy comprising in combination, a bi-directional current conducting semiconductor normally exhibiting a high impedance between two terminals thereof connected in series with said timer motor and exhibiting a low impedance therebetween in response to the application of a signal having an amplitude greater than a predetermined magnitude to a third terminal thereof, and triggering means operable during at least a selected one of the steps of operation to apply signals to said third terminal that are characterized by an amplitude of at least said predetermined magnitude to control the percent of full wave electrical energy provided said timer motor during said step independent of other steps.

13. The invention as set forth is claim 12 wherein said triggering means includes means responsive to a predetermined high level of liquid in the container and effective during wash and rinse steps to permit application of signals to said third terminal that are characterized by an amplitude of at least said predetermined value until liquid in the container reaches said predetermined high level.

14. The invention as set forth in claim 12 wherein said triggering means includes means responsive to a predetermined low level of liquid in the container and effective during vitiated liquid removal steps to substantially prevent application of signals to said third terminal that are characterized by an amplitude of at least said predetermined value until liquid in the container is reduced to said predetermined low level.

References Cited
UNITED STATES PATENTS

| | | | |
|---|---|---|---|
| 3,171,045 | 2/1965 | Jacobs | 68—12 X |
| 3,217,188 | 11/1965 | Bauer | 68—12 X |
| 3,246,182 | 4/1966 | Hanchett | 68—141 |

WILLIAM I. PRICE, *Primary Examiner.*